US 6,661,764 B2

(12) United States Patent
Hino et al.

(10) Patent No.: US 6,661,764 B2
(45) Date of Patent: Dec. 9, 2003

(54) DISC REPRODUCING DEVICE

(75) Inventors: Yutaka Hino, Yokohama (JP); Hiroki Kobayashi, Yokohama (JP); Masakazu Hijikata, Sagamihara (JP); Minoru Hirata, Farmington Hills, MI (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 79 days.

(21) Appl. No.: 09/870,997

(22) Filed: Jun. 1, 2001

(65) Prior Publication Data

US 2002/0018427 A1 Feb. 14, 2002

(30) Foreign Application Priority Data

Jun. 1, 2000  (JP) ........................................ 2000-165088

(51) Int. Cl.⁷ .............................................. G11B 17/04
(52) U.S. Cl. ..................................... 369/77.1; 369/77.2
(58) Field of Search ................................. 369/77.2, 77.1, 369/75.2, 76, 78, 79; 360/94, 99.02, 99.06

(56) References Cited

U.S. PATENT DOCUMENTS

| 4,470,136 | A | * | 9/1984 | Takahashi et al. ........... 369/77.1 |
| 4,482,993 | A | * | 11/1984 | Agostini ...................... 369/263 |
| 5,031,169 | A | * | 7/1991 | Kato et al. ................... 369/75.2 |
| 5,031,171 | A | * | 7/1991 | Kurumada et al. ........... 369/270 |
| 5,036,509 | A | * | 7/1991 | Kobayashi et al. ........... 369/75.2 |
| 5,113,388 | A | * | 5/1992 | Yamada et al. ............... 369/270 |
| 5,173,893 | A | * | 12/1992 | Morikawa et al. ........... 369/77.1 |
| 5,204,849 | A | * | 4/1993 | Yamada et al. ............... 369/75.2 |
| 5,226,028 | A | * | 7/1993 | Yamada et al. ............... 369/77.1 |
| 5,590,109 | A | * | 12/1996 | Ookawa et al. .............. 369/77.2 |
| 6,125,090 | A | * | 9/2000 | Nakamichi .................. 369/75.2 |
| 6,137,761 | A | * | 10/2000 | Oh et al. ..................... 369/77.1 |
| 6,147,948 | A | * | 11/2000 | Tanaka et al. ............... 369/77.1 |
| 6,167,015 | A | * | 12/2000 | Jeong ......................... 369/77.1 |
| 6,445,665 | B2 | * | 9/2002 | Yabushita et al. ........... 369/77.1 |
| 6,469,971 | B1 | * | 10/2002 | Sato et al. ................... 369/77.1 |

FOREIGN PATENT DOCUMENTS

| EP | 0 296 829 A2 | 12/1988 |
| GB | 2 120 831 A | 12/1983 |
| JP | 10-92080 | 4/1998 |

* cited by examiner

Primary Examiner—Brian E. Miller
Assistant Examiner—Minh Le
(74) Attorney, Agent, or Firm—Browdy and Neimark, P.L.L.C.

(57) ABSTRACT

A disc reproducing device has a lock pin for positioning a small-diameter disc inserted into the device in a reproducing position by being loaded by a spring with a force that rotates it about a horizontal shaft, a lock plate for locking the lock pin in a protruding state in the normal state, and a disc detecting lever, locked by being pressed by the outer periphery of a large-diameter disc inserted, for moving the lock plate horizontally with its front end so as to lock and unlock the lock pin. The lock pin in its unlocked state is rotated by being pressed by the large-diameter disc, and, after the largest dimensioned portion of the large-diameter disc passes over the disc detecting lever, the lock plate returns to its original position to lock the lock pin in its falling-down state. With this construction, either an 8-cm-diameter disc or a 12-cm-diameter disc can be reproduced simply by inserting the disc into the device without using an adopter dedicated to an 8-cm-diameter disc.

8 Claims, 10 Drawing Sheets

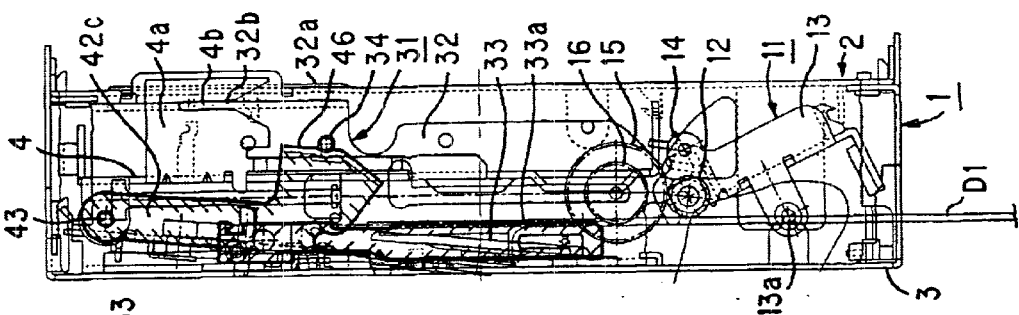
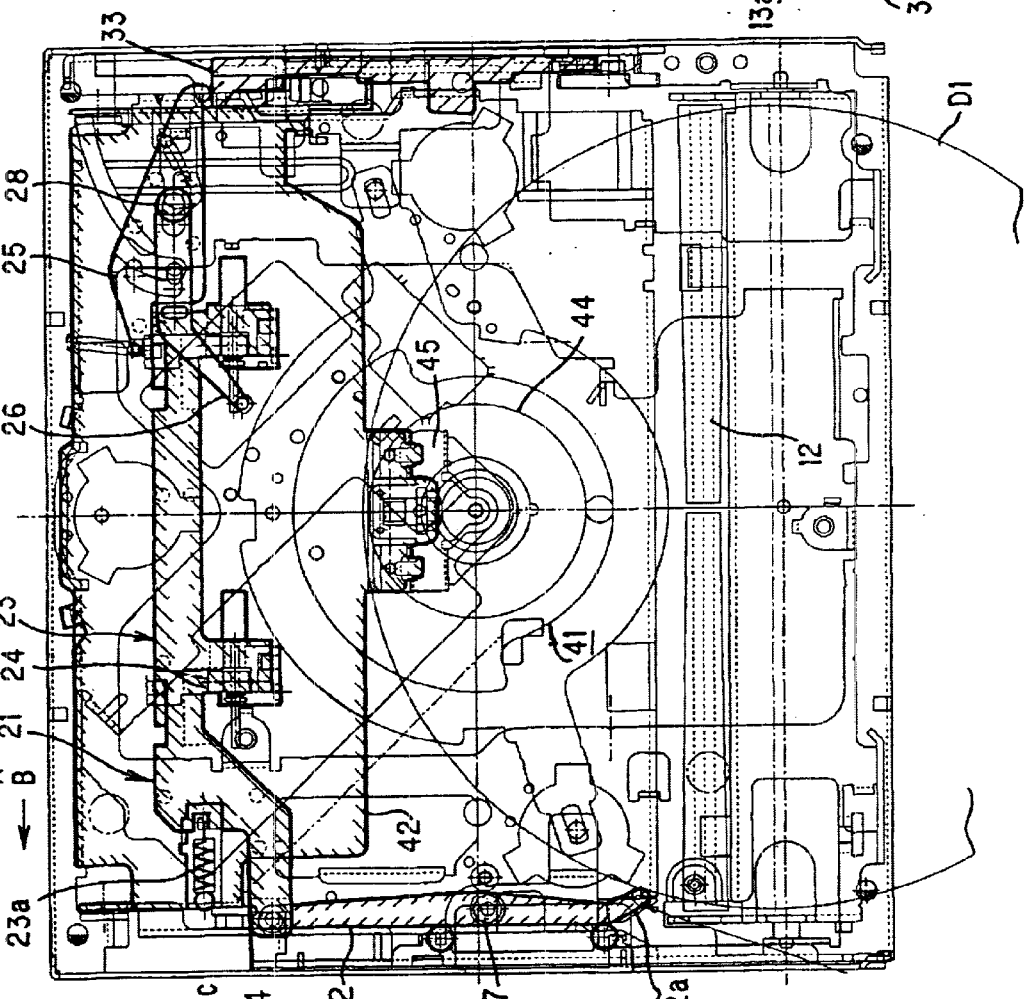
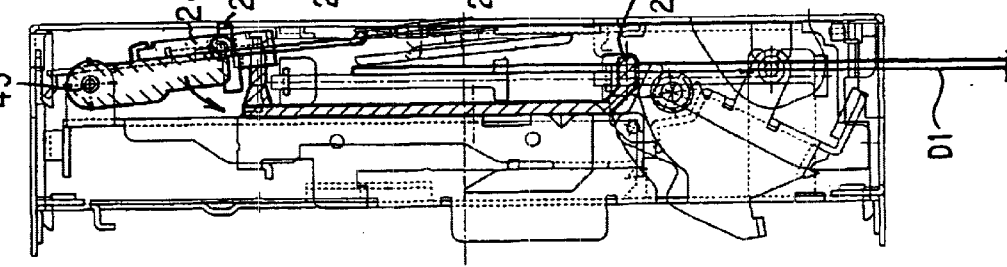

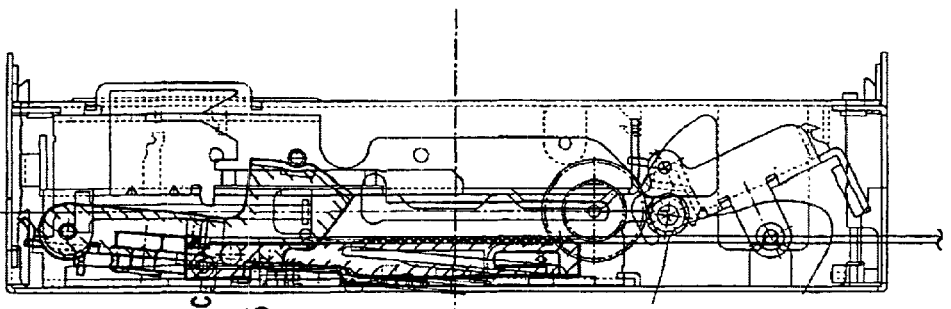
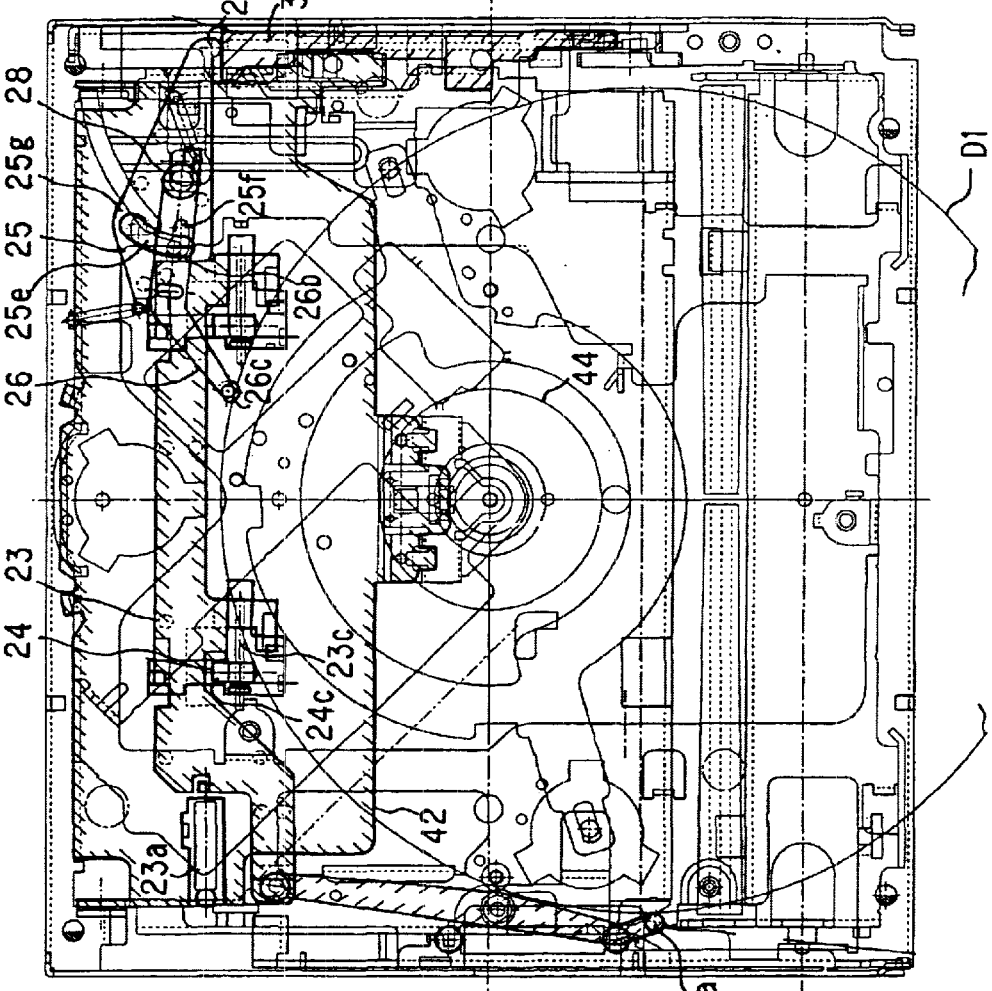
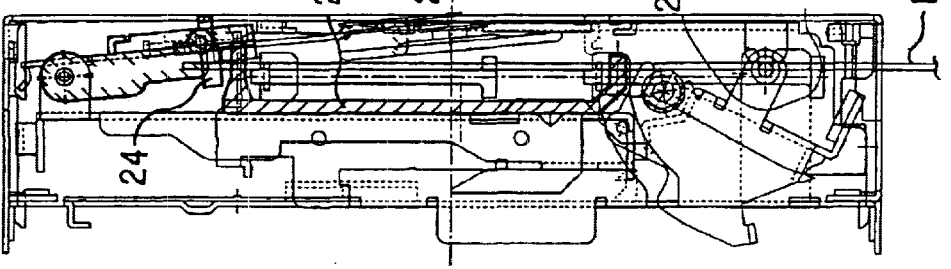

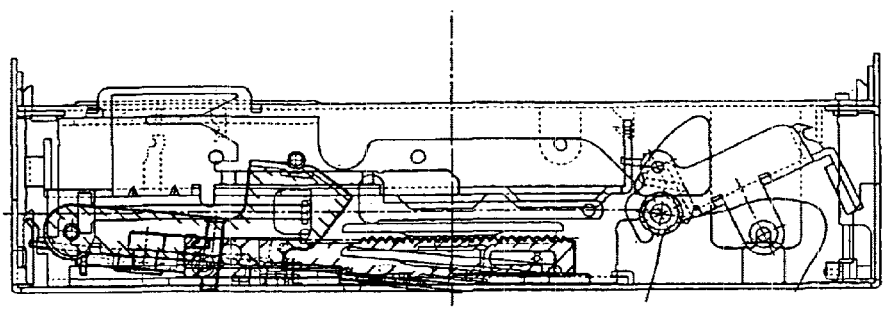
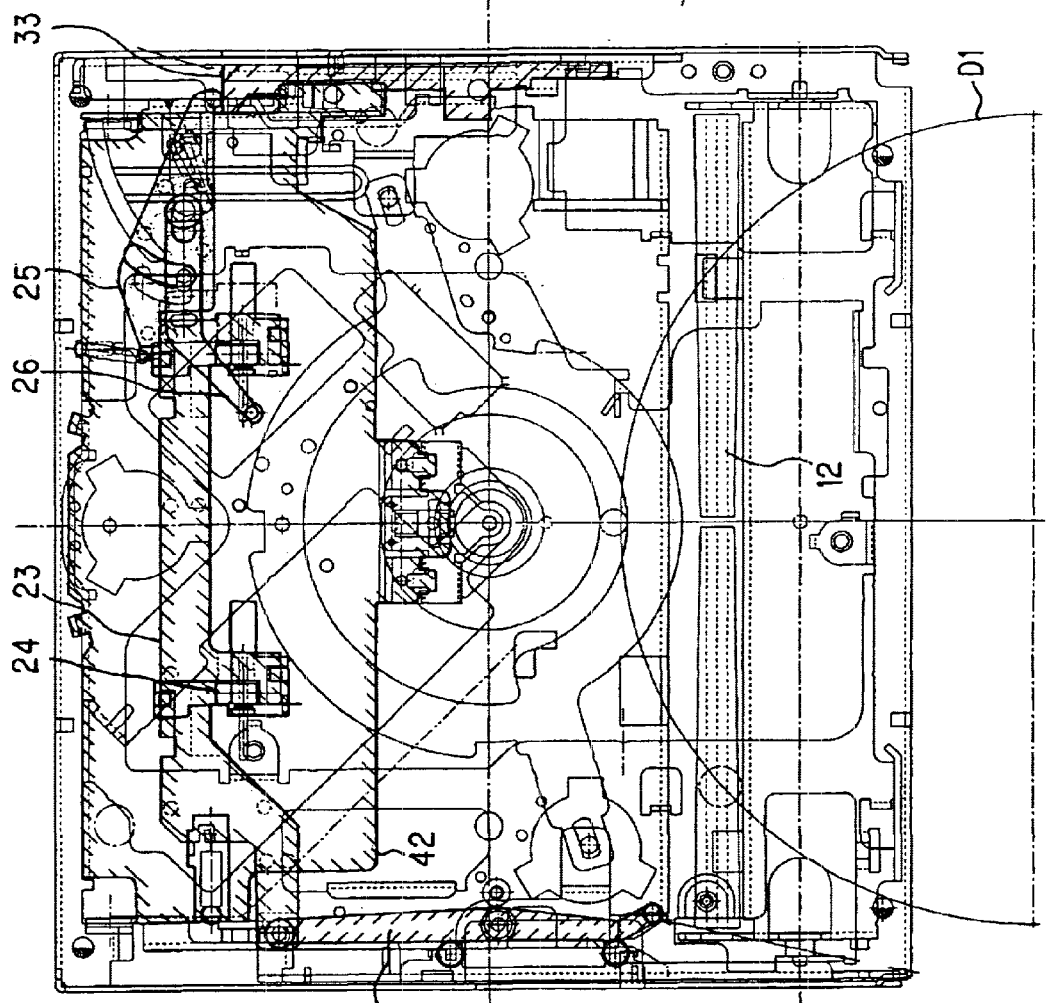
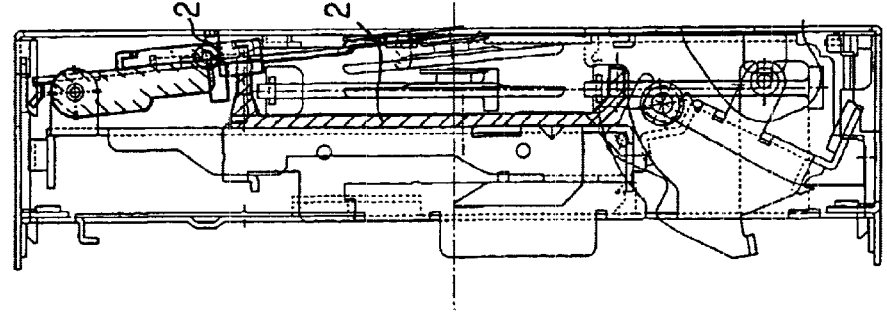

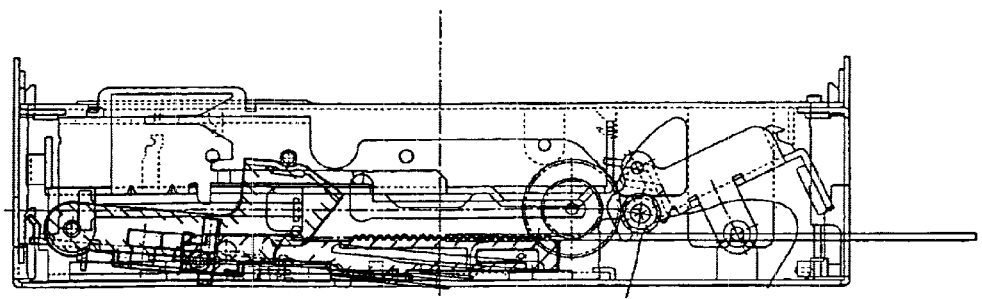
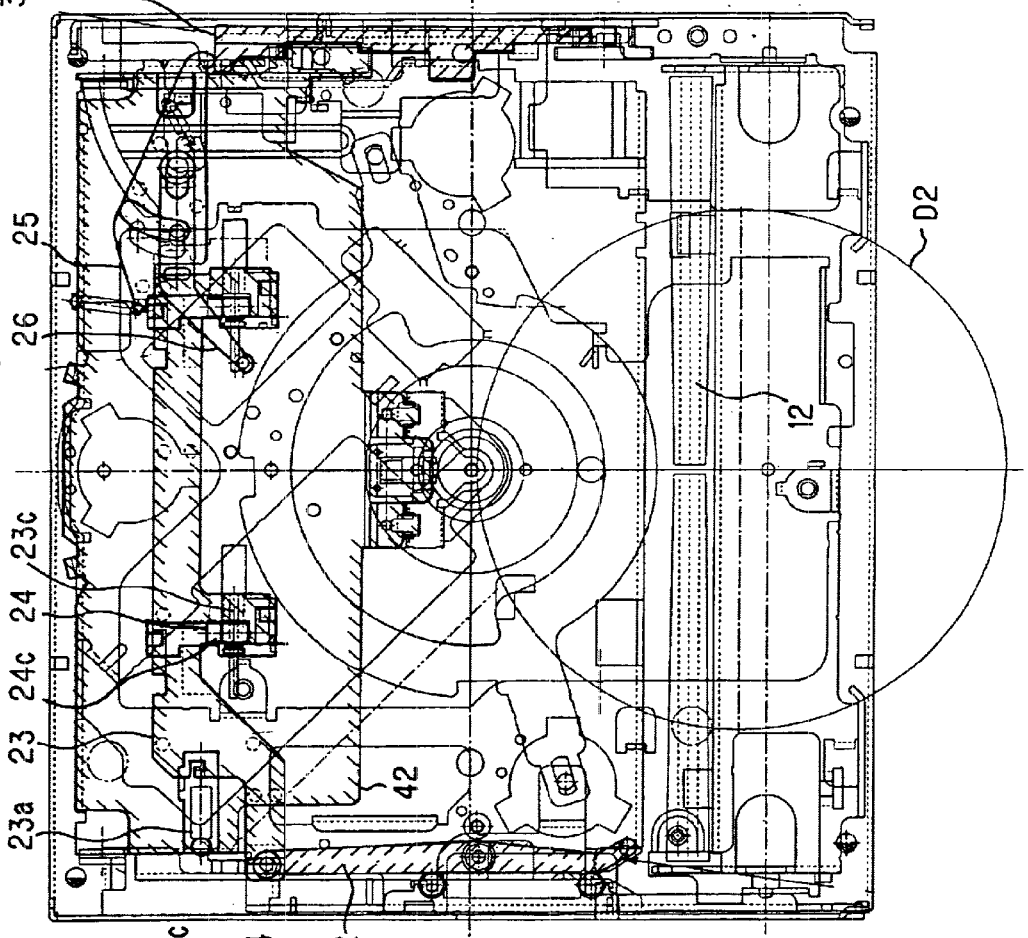
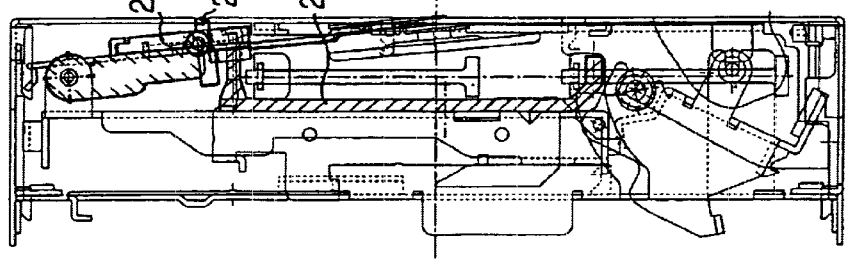

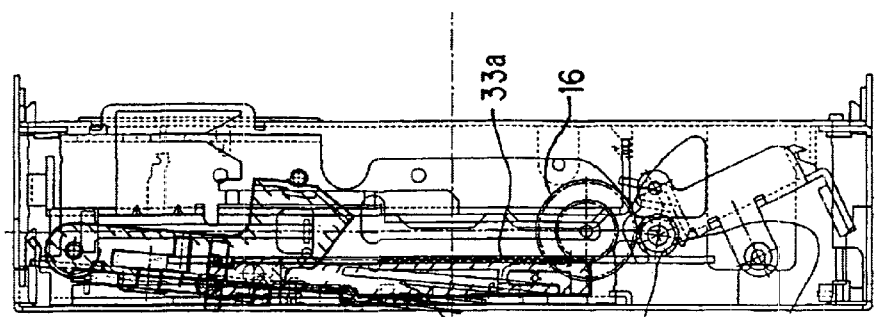
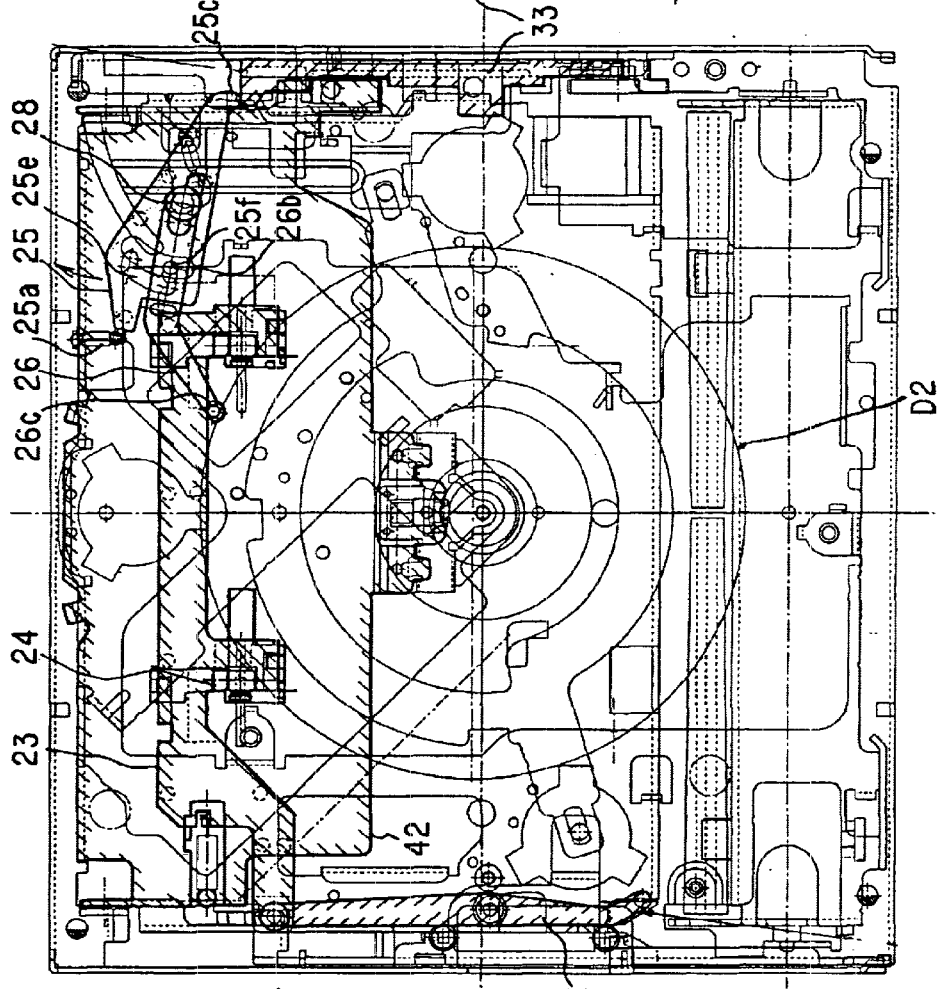
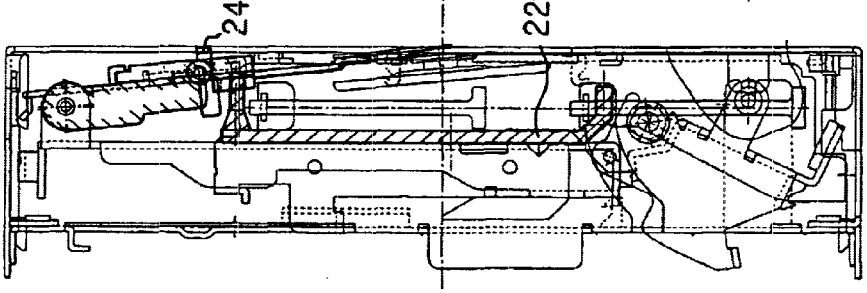

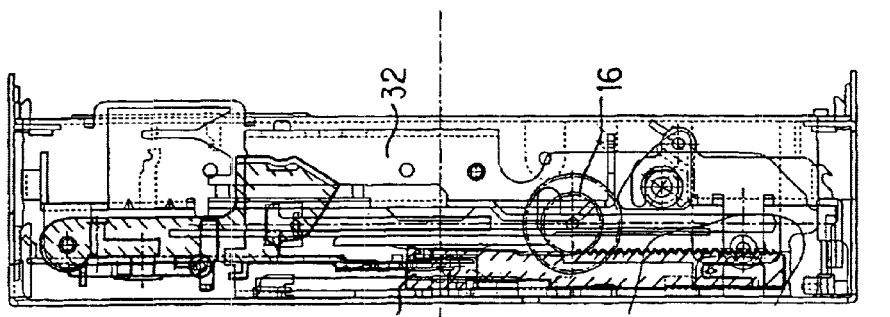
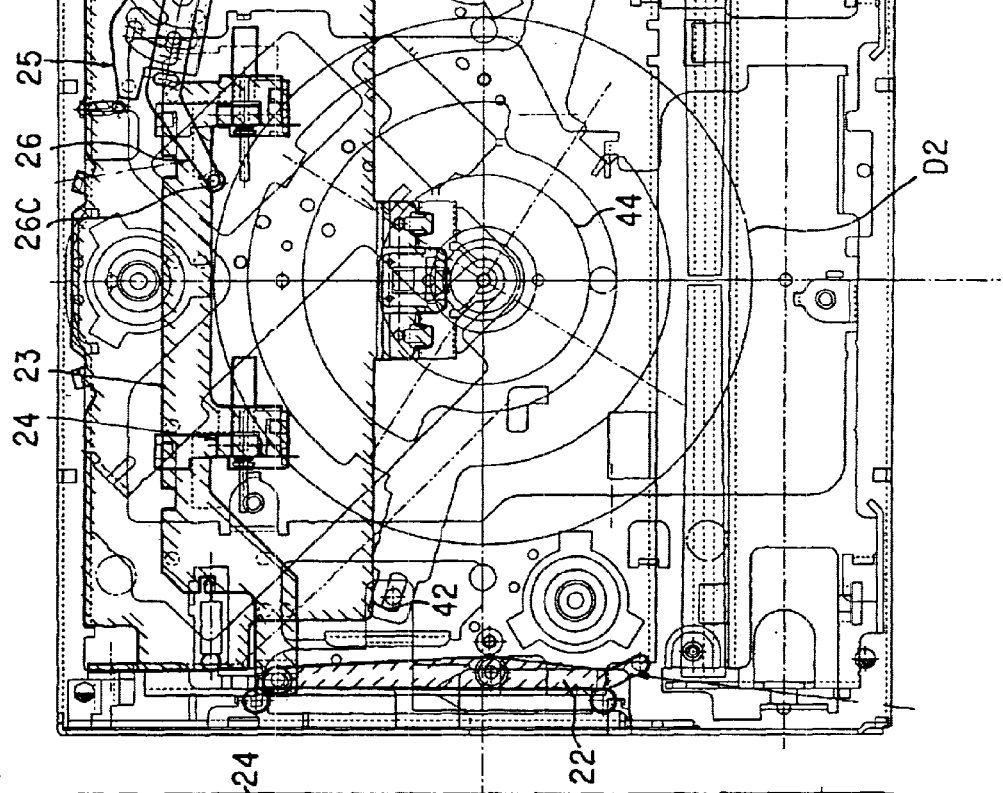
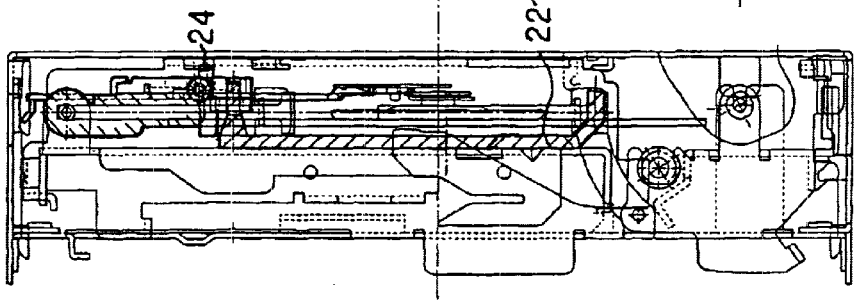

DISC REPRODUCING DEVICE

BACKGROUND OF THE INVENTION

1. Field of the Invention

The present invention relates to a disc reproducing device capable of reproducing a large-size disc 12 centimeters in diameter and a small-size disc 8 centimeters in diameter.

2. Description of Prior Art

Conventionally, a disc reproducing device of this type is designed to drive a large-size disc 12 centimeters in diameter inserted thereinto. Thus, to reproduce a small-size disc 8 centimeters in diameter, the disc needs to be set in an adapter dedicated thereto before being inserted into the device.

However, such a conventional disc reproducing method of using an adapter has the following disadvantages. An 8-cm-diameter disc cannot be reproduced without an adapter and thus care needs to be taken for the storage of the adapter. Moreover, mounting an 8-cm-diameter disc in the adapter requires much time.

SUMMARY OF THE INVENTION

According to one aspect of the present invention, there is provided a disc reproducing device having a disc detecting mechanism. The disc detecting mechanism includes: a disc detecting lever; a lock plate; a lock pin; and means for positioning the large-diameter disc. The disc detecting lever has its main end rotated by being pressed by the outer periphery of a large-diameter disc inserted into the device and thereby having its front end moved horizontally. Also, the disc detecting lever rotates in the reverse direction after the passage of the largest dimensioned portion of the large-diameter disc. The lock plate follows the movement of the front end of the disc detecting lever so as to move horizontally. The lock pin is, in the normal state, locked by the lock plate in a protruding state so as to position a small-diameter disc inserted into the device. Also, the lock pin is unlocked by the horizontal movement of the lock plate, and is pushed by the outer periphery of the inserted large-diameter disc to its down position. Furthermore, the lock pin is locked in its falling-down state by the reverse-directional movement of the lock plate caused by the passage of the largest dimensioned portion of the large-diameter disc. In this construction, when a small-diameter disc is inserted into the device, the lock pin positions the small-diameter disc in a reproducing position, and when a large-diameter disc is inserted into the device, the lock pin is pressed by the outer periphery of the large-diameter disc so as to allow the passage of the large-diameter disc. Consequently, either a large-diameter or small-diameter disc can be reproduced.

Moreover, in the disc reproducing device of the present invention, the aforementioned disc detecting mechanism has an adjusting plate and a shift arm. The adjusting plate follows the horizontal movement of the lock plate so as to move horizontally and moves rotatably about a shaft. The shift arm is arranged rotatably about the shaft, and is unlocked by the horizontal, inward movement of the adjusting plate so that it is rotated by being pressed by the outer periphery of the large- or small-diameter disc. In this construction, regardless of whether a large-diameter disc or a small-diameter disc is inserted, the positioning of the inserted disc in the reproducing position can be detected by confirming the movement of the adjusting plate.

Further, the disc reproducing device of the present invention has a disc clamping mechanism with clamping means. The disc clamping means rotates in synchronization with the rotation of the adjusting plate and retains a large- or small-diameter disc inserted into the device in a turntable. In this construction, positioning and clamping of a disc can be achieved concurrently.

Further, the disc reproducing device of the present invention is characterized in that the position of the large- or small-diameter disc determined by the positioning means or the lock pin is offset inwardly in the device relative to the position of the large- or small-diameter disc retained in the turntable by the clamping means. In this construction, when the disc is retained in the turntable, an offset-equivalent gap is secured between the disc and the positioning means or the lock pin. This makes smooth rotation of the disc possible.

Further, the disc reproducing device of the present invention has a suspension chassis. The suspension chassis rotationally supports the clamping arm of the disc clamping mechanism and is supported via a damper and a damper spring by the main chassis of the device. In this construction, the suspension chassis, which is in a floating state during reproduction of a disc, is provided with a disc clamping mechanism. This allows the disc reproducing device to be applied to an audio apparatus which receives vibration caused by vehicles or the like.

Further, in the disc reproducing device of the present invention, the suspension chassis has suspension lock means. The suspension lock means, in the normal state, fixes the suspension chassis to the main chassis, and releases the fixing during reproduction of a disc. In this construction, when a disc is deactivated, the suspension chassis is fixed tightly to the main chassis, and, when the disc is activated, the suspension chassis is kept in a floating state. This enables disc reproduction free of sound fluctuation.

Further, the disc reproducing device of the present invention is characterized in that, when the adjusting plate rotates, the movement of the adjusting plate drives the suspension lock means to operate, and the movement of the suspension lock means rotates the clamping arm so as to clamp the large- or small-diameter disc. In this construction, the operations ranging from insertion to clamping of a large- or small-diameter disc can be achieved successively in a short period of time.

According to another aspect of the present invention, a disc reproducing device includes: a chassis mechanism composed of an upper chassis, a lower chassis, and a suspension chassis; a disc conveyance mechanism for conveying a disc between an insertion/ejection position and a reproducing position within the device; a disc detecting mechanism having lock means, the lock means having positioning means used for a small-diameter disc inserted, the lock means for releasing the locking of the positioning means so that it is pushed by the outer periphery of a large-diameter disc to its down position when the inserted disc is the large-diameter disc; a suspension lock mechanism for locking and unlocking the suspension chassis relatively to the lower chassis in synchronization with the movement of the disc detecting mechanism; a disc clamping mechanism disposed in the suspension chassis for clamping the disc conveyed to the reproducing position onto a turntable; and a disc reproducing mechanism for reproducing the clamped disc. In this construction, a disc, regardless of whether it is a large-diameter or small-diameter disc, can be reproduced simply by inserting the disc into the device.

Accordingly, the disc reproducing device of the present invention is constructed in the following manner. That is, the disc reproducing device having a disc detecting mechanism.

The disc detecting mechanism includes: a disc detecting lever; a lock plate; a lock pin; and means for positioning the large-diameter disc. The disc detecting lever has its main end rotated by being pressed by the outer periphery of a large-diameter disc inserted into the device and thereby having its front end moved horizontally. Also, the disc detecting lever rotates in the reverse direction after the passage of the largest dimensioned portion of the large-diameter disc. The lock plate follows the movement of the front end of the disc detecting lever so as to move horizontally. The lock pin is, in the normal state, locked by the lock plate in a protruding state so as to position a small-diameter disc inserted into the device. Also, the lock pin is unlocked by the horizontal movement of the lock plate, and is pushed by the outer periphery of the inserted large-diameter disc to its down position. Furthermore, the lock pin is locked in its falling-down state by the reverse-directional movement of the lock plate caused by the passage of the largest dimensioned portion of the large-diameter disc. With this construction, a disc, regardless of whether it is a large-diameter or small-diameter disc, can be reproduced simply by inserting the disc into the device.

Moreover, the disc reproducing device of the present invention is constructed in the following manner. That is, the disc reproducing device includes: a chassis mechanism composed of an upper chassis, a lower chassis, and a suspension chassis; a disc conveyance mechanism for conveying a disc between an insertion/ejection position and a reproducing position within the device; a disc detecting mechanism with lock means, the lock means having positioning means used for a small-diameter disc inserted the lock means for releasing the locking of the positioning means so that it is pushed by the outer periphery of a large-diameter disc to its down position when the inserted disc is the large-diameter disc; a suspension lock mechanism for locking and unlocking the suspension chassis relatively to the lower chassis in synchronization with the movement of the disc detecting mechanism; a disc clamping mechanism disposed in the suspension chassis for clamping the disc conveyed to the reproducing position onto a turntable; and a disc reproducing mechanism for reproducing the clamped disc. With this construction, a disc, regardless of whether it is a large-diameter or small-diameter disc, can be reproduced simply by inserting the disc into the device.

The present invention has been made to solve the above described problems in the prior art, and has a first object to provide a disc reproducing device capable of reproducing either a large-diameter or small-diameter disc without using an adopter dedicated to a small-diameter disc, and has a second object to provide a disc reproducing device capable of reproducing a disc, regardless of whether it is a large-diameter or small-diameter disc, simply by inserting the disc into the device.

BRIEF DESCRIPTION OF THE DRAWINGS

FIG. 1(*a*) is a schematic plan view illustrating the disc reproducing device of an embodiment of the present invention, wherein a large-diameter disc is inserted thereinto;

FIG. 1(*b*) is a schematic left-hand side view illustrating the disc reproducing device of the embodiment of the present invention, wherein a large-diameter disc is inserted thereinto;

FIG. 1(*c*) is a schematic right-hand side view illustrating the disc reproducing device of the embodiment of the present invention, wherein a large-diameter disc is inserted thereinto;

FIG. 3(*a*) is a schematic plan view illustrating the disc reproducing device of the embodiment of the present invention into which a large-diameter disc is inserted, with its lock pin being left in a released state;

FIG. 3(*b*) is a schematic left-hand side view illustrating the disc reproducing device of the embodiment of the present invention into which a large-diameter disc is inserted, with its lock pin being left in a released state;

FIG. 3(*c*) is a schematic right-hand side view illustrating the disc reproducing device of the embodiment of the present invention into which a large-diameter disc is inserted, with its lock pin being left in a released state;

FIG. 4(*b*) is a schematic left-hand side view illustrating the disc reproducing device of the embodiment of the present invention into which a large-diameter disc is inserted, with the disc being positioned;

FIG. 4(*c*) is a schematic right-hand side view illustrating the disc reproducing device of the embodiment of the present invention into which a large-diameter disc is inserted, with the disc being positioned;

FIG. 5(*b*) is a schematic left-hand side view illustrating the disc reproducing device of the embodiment of the present invention into which a large-diameter disc is inserted, with the disc being clamped;

FIG. 5(*c*) is a schematic right-hand side view illustrating the disc reproducing device of the embodiment of the present invention into which a large-diameter disc is inserted, with the disc being clamped;

FIG. 6(*a*) is a schematic plan view illustrating the disc reproducing device of the embodiment of the present invention, wherein a large-diameter disc is being ejected therefrom;

FIG. 6(*b*) is a schematic left-hand side view illustrating the disc reproducing device of the embodiment of the present invention, wherein a large-diameter disc is being ejected therefrom;

FIG. 6(*c*) is a schematic right-hand side view illustrating the disc reproducing device of the embodiment of the present invention, wherein a large-diameter disc is being ejected therefrom;

FIG. 7(*a*) is a schematic plan view illustrating the disc reproducing device of the embodiment of the present invention, wherein a small-diameter disc is inserted thereinto;

FIG. 7(*b*) is a schematic left-hand side view illustrating the disc reproducing device of the embodiment of the present invention, wherein a small-diameter disc is inserted thereinto;

FIG. 7(*c*) is a schematic right-hand side view illustrating the disc reproducing device of the embodiment of the present invention, wherein a small-diameter disc is inserted thereinto;

FIG. 8(*a*) is a schematic plan view illustrating the disc reproducing device of the embodiment of the present invention into which a small-diameter disc is inserted, with the disc being positioned;

FIG. 8(b) is a schematic left-hand side view illustrating the disc reproducing device of the embodiment of the present invention into which a small-diameter disc is inserted, with the disc being positioned;

FIG. 8(c) is a schematic right-hand side view illustrating the disc reproducing device of the embodiment of the present invention into which a small-diameter disc is inserted, with the disc being positioned;

FIG. 9(a) is a schematic plan view illustrating the disc reproducing device of the embodiment of the present invention into which a small-diameter disc is inserted, with the disc being clamped;

FIG. 9(b) is a schematic left-hand side view illustrating the disc reproducing device of the embodiment of the present invention into which a small-diameter disc is inserted, with the disc being clamped;

FIG. 9(c) is a schematic right-hand side view illustrating the disc reproducing device of the embodiment of the present invention into which a small-diameter disc is inserted, with the disc being clamped;

Figure 2:
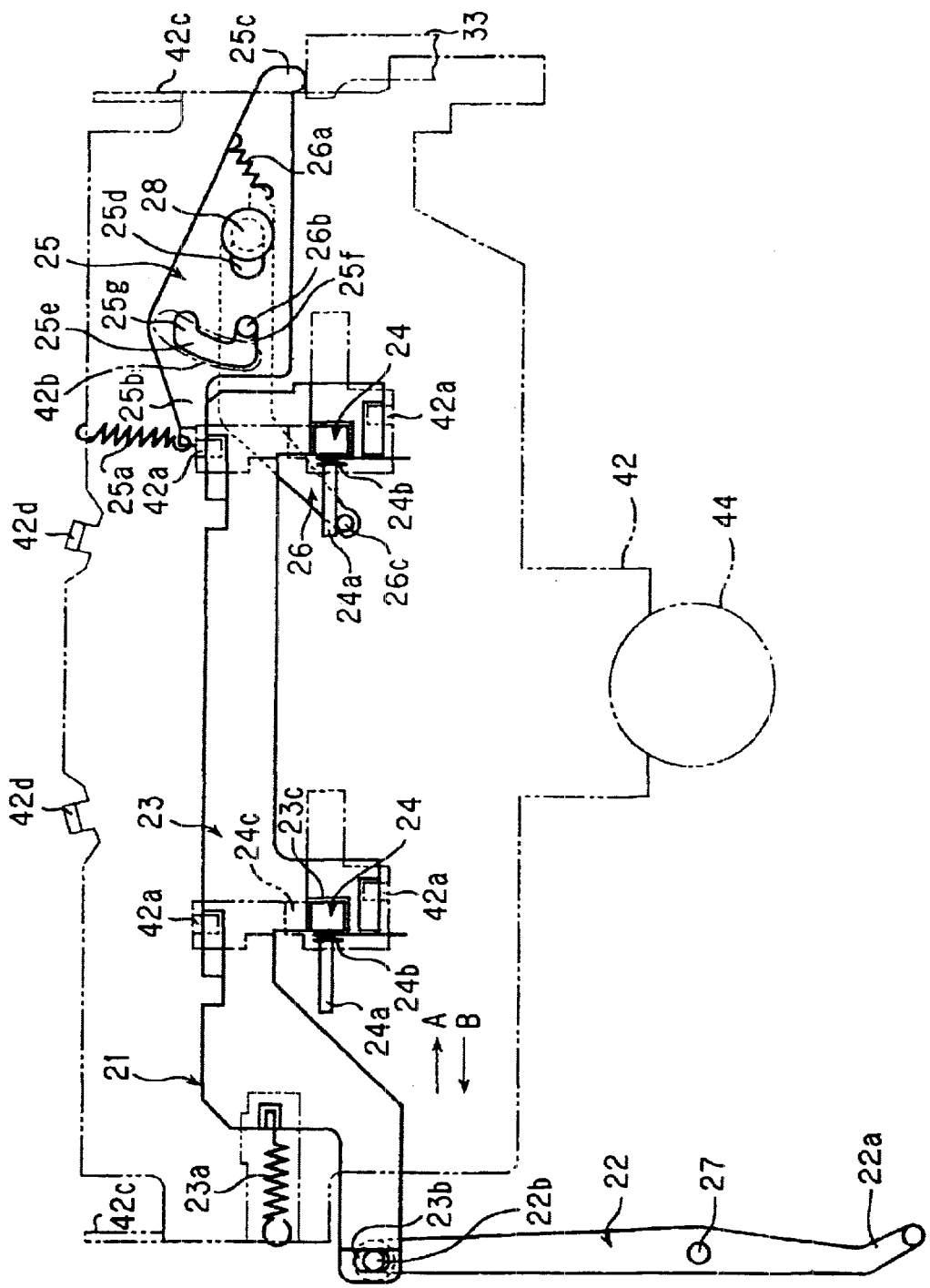
FIG. 2 is a schematic plan view illustrating the structure of the disc detecting mechanism employed in the embodiment of the present invention.

The above and further objects and features of the present invention will more fully be apparent from the following detailed description taken in conjunction with the accompanying drawings.

DESCRIPTION OF THE PREFERRED EMBODIMENTS

Hereinafter, an embodiment of the present invention will be described with reference to the drawings. Note that the novel feature believed characteristic of the present invention is that a disc, regardless of whether it is a large-diameter or small-diameter disc, can be reproduced simply by inserting the disc into the device. Thus, only a brief description will be given as to the other structural aspects thereof.

FIGS. 1(a) to 1(c) are views illustrating the structure of the disc reproducing device of the embodiment of the present invention, with FIG. 1(a) showing a plan view, FIG. 1(b) showing a left-hand side view, and FIG. 1(c) showing a right-hand side view. In these figures, the constituent components are depicted without regard to their fore/aft and up/down relationships so that the positional relationships among them are shown in a single paper sheet. Moreover, the areas of these components that have undergone hatching and smudging are not represented as cross sections but as appearances of the components. In FIGS. 1(a) to 1(c), the entire disc reproducing device is provided with: a chassis mechanism 1 composed of an upper chassis, a lower chassis, and a suspension chassis; a disc conveyance mechanism 11 for conveying a disc between an insertion/ejection position and a reproducing position within the device; a disc detecting mechanism 21 having lock means, the lock means having positioning means used for a small-diameter disc D2 inserted, the lock means for releasing the locking of the positioning means so that it is pushed by the outer periphery of a large-diameter disc D1 to its down position when the inserted disc is a large-diameter disc D1; a suspension lock mechanism 31 for locking and unlocking the suspension chassis in the chassis mechanism 1 in synchronization with the movement of the disc detecting mechanism 21; a disc clamping mechanism 41 disposed in the suspension chassis for clamping the disc conveyed to the reproducing position onto a turntable; and a disc reproducing mechanism for reproducing the disc (not shown).

The chassis mechanism 1 is composed of the lower chassis 2 and the upper chassis 3 constituting a main chassis, and the suspension chassis 4 supported relatively in the lower chassis 2 via a damper and a damper spring. The suspension chassis 4 is locked or unlocked by the suspension lock mechanism 31 with respect to the lower and upper chassises 2 and 3.

The disc conveyance mechanism 11 has a feed roller 12 which conveys the inserted large disc D1 12 centimeters in diameter or small disc D2 8 centimeters in diameter between the insertion/ejection position and the reproducing position within the device. The feed roller 12, a drum-shaped roller whose center portion has a relatively small diameter, is disposed in a feed plate 13 arranged so as to be rockable about a shaft 13a with respect to the lower chassis 2. The feed roller 12 has its roller gear 14, formed in the shaft-end portion, engaged with a driving gear 15 disposed in the lower chassis 2, and is thereby rotationally driven. The driving gear 15 is rotationally driven by a feed motor (not shown).

The disc detecting mechanism 21 is provided with a disc detecting lever 22, a lock plate 23, a lock pin 24, an adjusting plate 25, and a shift arm 26. The disc detecting lever 22 is rotatably disposed via a shaft 27 in the suspension chassis 4. The lock plate 23 moves horizontally in synchronization with the movement of the front end of the disc detecting lever 22. The lock pin 24 is, in the normal state, locked by the lock plate 23 in a protruding state so as to position the small-diameter disc D2 inserted into the device in the reproducing position. Also, it is unlocked by the movement of the lock plate 23 in a horizontal, inward direction A, and is pushed to its down position by being pressed by the outer periphery of the inserted large-diameter disc D1. Then, it is locked in its falling-down state by the movement of the lock plate 23 in a horizontal, outward direction B caused by the passage of the largest dimensioned portion of the large-diameter disc D1 over a pin 22a provided in the main end of the disc detecting lever 22 The adjusting plate 25 follows the horizontal movement of the lock plate 23 so as to move horizontally, and rotates about a shaft 28. The shift arm 26 is arranged so as to be rotatable about the shaft 28 of the adjusting plate 25. Also, the shift arm 26 is unlocked by the movement of the adjusting plate 25 in the horizontal, outward direction B so as to be rotated by being pressed by the outer periphery of the large- or small-diameter disc D1 or D2.

As shown in FIG. 2, the disc detecting lever 22 has a pin 22b clamped in its front end so as to extend upwardly. The pin 22b is engaged in a slot 23b formed in the front end of the lock plate 23. The lock plate 23 is caught in a folded piece 42a formed on the top surface of the clamping arm 42 and arranged so as to be horizontally slidable. The lock plate 23 is also loaded by an extension coil spring 23a with a force pushing it in the horizontal, outward direction B. The lock pin 24 having a substantially rectangular section is attached to the clamping arm 42 so as to be rotatable about a horizontal shaft 24a. Also, it is loaded by a torsion coil spring 24b with a force rotating it about the horizontal shaft 24a in a counterclockwise direction as seen from the left-hand side. Furthermore, the lock pin 24 is caught, in the normal state, in a rectangular lock groove 23c formed in the lock plate 23 so as to protrude downwardly, and is locked in the protruding state by having its inwardly-protruding lock piece 24c pressed by the outer edge of the lock groove 23c of the lock plate 23. The adjusting plate 25 is disposed on the top surface of the clamping arm 42 so as to be rotatable about the shaft 28, and is loaded by an extension coil spring 25a with a force rotating it in a clockwise direction. The adjusting plate 25 has its front end 25c abutted against the left end of a rack plate 33, and is thereby positioned. The shift arm 26 is disposed on the bottom surface of the clamping arm 42 so as to be rotatable about the shaft 28, and is loaded by an extension coil spring 26a with a force rotating it in a counterclockwise direction. The shaft 28 is clamped in the rear end of the shift arm 26 so as to extend upwardly. After passing through a circular hole formed in the clamping arm 42, it is floatably inserted through a slot 25d formed in the adjusting plate 25 and thereafter has its front end caulked. Accordingly, the adjusting plate 25 is movable within the slot 25d. Moreover, the shift arm 26 has a guide pin 26b clamped in its middle portion so as to extend upwardly. The guide pin 26b is inserted through a guide hole 42b of the clamping arm 42 so as to be engaged in a guide hole 25e of the adjusting plate 25. The guide hole 25e has at both ends inwardly-bent hook-shaped catch portions 25f and 25g. At the front end of the shift arm 26 is clamped an actuating pin 26c so as to extend downwardly. Moreover, inside the clamping arm 42 two positioning projections 42d for positioning the large-diameter disc D1 in the reproducing position are formed.

In FIGS. 1(a) to 1(c), the suspension lock mechanism 31 is provided with: suspension lock plates 32 (hereafter simply referred to as "the sus-lock plate") disposed at both of left- and right-hand ends of the lower chassis 2 so as to be slidable in forward and backward directions; a lock plate 32a disposed in the lower portion of the sus-lock plate 32 so as to extend inwardly in a horizontal direction and having a Y-shaped lock groove 32b formed therein; a lock plate 4a disposed in the suspension chassis 4 so as to extend downwardly and having a Y-shaped lock groove 4b formed therein; the rack plate 33 disposed in the right-hand sus-lock plate 32 so as to be slidable in forward and backward directions; and an actuating pin 34 clamped in the right-hand sus-lock plate 32 so as to protrude outwardly in a horizontal direction. The sus-lock plate 32 and the rack plate 33 are each loaded by an extension coil spring with a force pulling them toward the inside of the device.

The disc clamping mechanism 41 has clamping arms 42 disposed on both sides of the rear end of the suspension chassis 4 so as to be rockable about a shaft 43. The clamping arm 42 has on its top board the above-described disc detecting mechanism 21, and has on the end located in its central portion a circular disc clamp 44 via a clamping spring 45 shaped like a plate spring. The disc clamp 44 applies pressure to the disc put in the reproducing position so that the rotation axis of the turntable disposed in the suspension chassis 4 is inserted into the center hole of the disc. Moreover, of the plates provided on both sides of the clamping arm 42, the right-hand plate 42c has in its front end a guide piece 46 protruding horizontally outwardly so that the clamping arm 42 is engageable with a guide pin 34 of the sus-lock plate 32. The disc reproducing mechanism is of conventional type that has a turntable for holding and rotating a disc and a optical pickup for reading a signal from the disc.

Next, a description will be given below as to the operation of the disc reproducing device of the embodiment, as observed when a large disc 12 centimeters in diameter is inserted thereinto. In FIGS. 1(a) to 1(c) and FIG. 2, in the normal state, the lock plate 23 of the disc detecting mechanism 21 is maintained in its position by the pull of the extension coil spring 23a. The lock piece 24c of the lock pin 24 is pushed down from its top side by the outer edge of the lock groove 23c of the lock plate 23 so that the lock pin 24 protrudes downwardly toward the lower portion of the clamping arm 42. Moreover, the adjusting plate 25 has its rear end 25c pushed by the rack plate 33 (stopped at a prescribed position), and is thereby maintained in its position. In this state, when the large disc D1 12 centimeter in diameter is inserted into the device, photodetector detects the insertion and generates a signal. In response to this signal, the feed motor rotates and thereby the feed roller 12 conveys the large-diameter disc D1 toward the inside of the device. After the conveyance of the large-diameter disc D1 the disc detecting lever 22 is, at the pin 22a provided in its main end, pushed by the outer periphery of the large-diameter disc D1, and is thereby rotated about the shaft 27 in a clockwise direction. Then, through the slot 23b engaged in the pin 22b provided in the front end thereof, the lock plate 23 moves in the horizontal, inward direction A.

In this way, as shown in FIGS. 3(a) to (c), the lock groove 23c of the lock plate 23 moves away from the lock pin 24. This allows the lock pin 24 to be rotatable about the horizontal shaft 24a. Then, the downwardly protruding lock pin 24 is pushed by the outer periphery of the large-diameter disc D1 against the torsion spring 24b, and is thereby rotated so as to be brought to its down position. Consequently, the large-diameter disc. D1 is further directed toward the inside of the device over the lock pin 24. Moreover, as shown in FIG. 2, as the lock plate 23 moves in the horizontal, inward direction A, its right-hand end pushes the adjusting plate 25 in the same direction. Thus, the slot 25d of the adjusting plate 25 is guided by the shaft 28 in movement, and simultaneously the guide pin 26b of the shift arm 26 received in the catch portion 25f of the adjusting plate 25's guide hole 25e moves away from the catch portion 25f. This allows the shift arm 26 to be rotatable about the shaft 28 along the guide hole 25e.

Figures 4A, 4B, 4C:
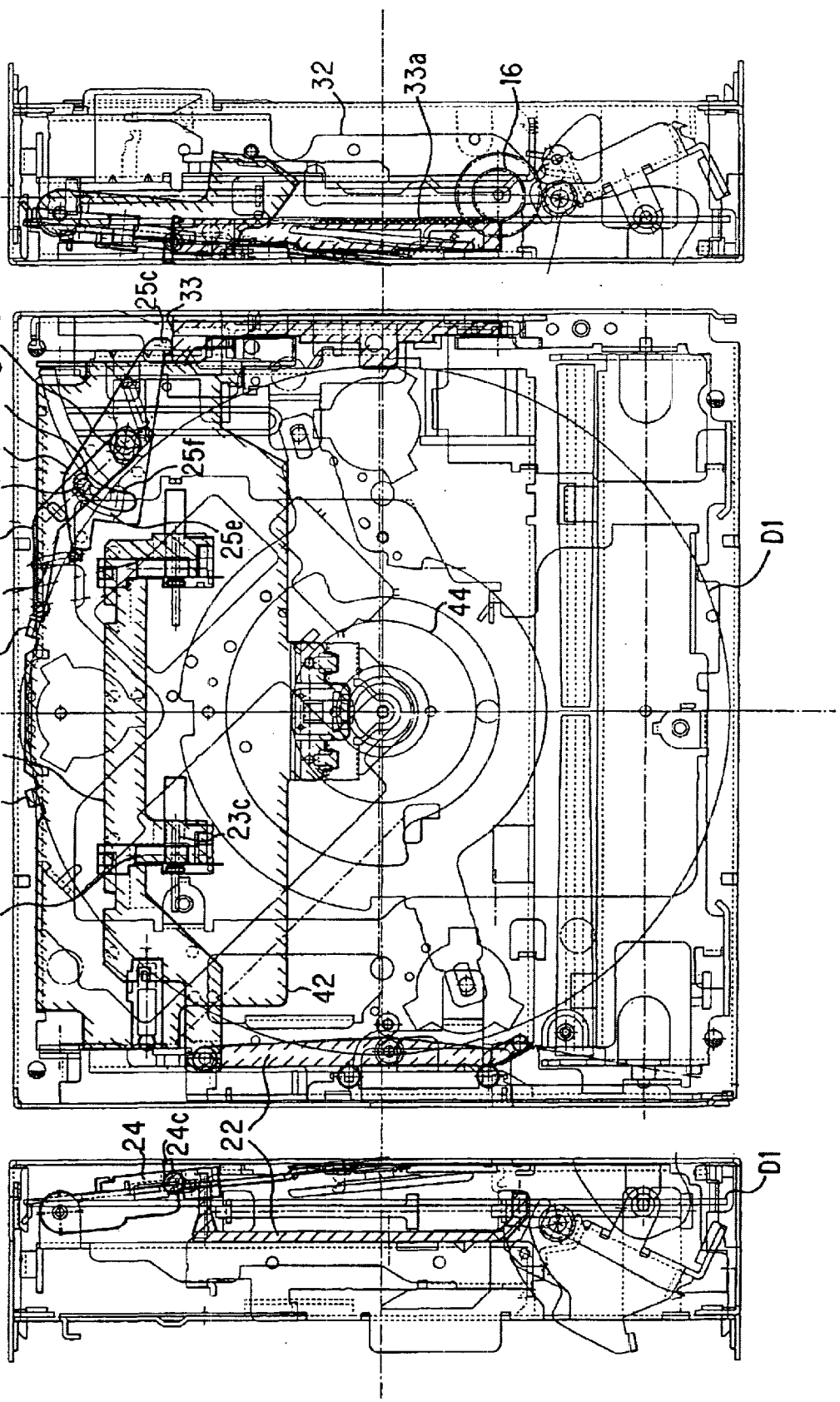
FIG. 4(*a*) is a schematic plan view illustrating the disc reproducing device of the embodiment of the present invention into which a large-diameter disc is inserted, with the disc being positioned.

Then, after the passage of the largest dimensioned portion of the large-diameter disc D1 over the pin 22a provided in the main end of the disc detecting lever 22, the lock plate 23 is loaded by the extension coil spring 23a with a force that keeps it pulled in the horizontal, outward direction B. Thus, as shown in FIGS. 4(a) to 4(c), the disc detecting lever 22 is rotated in a counterclockwise direction and simultaneously the lock plate 23 moves in the horizontal, outward direction B. Then, the lock pin 24 kept in the falling-down state is pushed down from its top side by the outer edge of the lock groove 23c of the lock plate 23 so as to be locked away from the large-diameter disc D1 in the falling-down state. Moreover, the shift lever 26 is, at its front-end pin 26c, pressed by the outer periphery of the large-diameter disc D1 so as to further rotate along with the adjusting plate 25 in a clockwise direction. Simultaneously, the outer periphery of the large-diameter disc D1 abuts against the positioning projection 42d provided in the rear end of the clamping arm 42, thereby t0 achieving positioning. In this state, the center of the large-diameter disc D1 is located inwardly at an offset d relative to the center of the disc clamp, and the adjusting plate 25 is slightly moved toward its original position by the movement of the lock plate 23 in the horizontal, outward direction B. Thus, the shift lever 26 is, at its guide pin 26b, caught in the catch portion 25g provided inside the guide hole 25e of the adjusting plate 25, and is maintained in the state by the extension coil spring 26a.

Figure 5C:
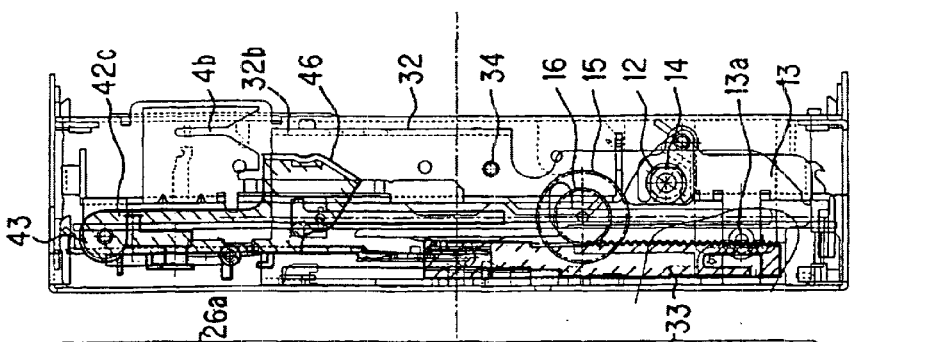
FIG. 5(*a*) is a schematic plan view illustrating the disc reproducing device of the embodiment of the present invention into which a large-diameter disc is inserted, with the disc being clamped.
Figure 5A:
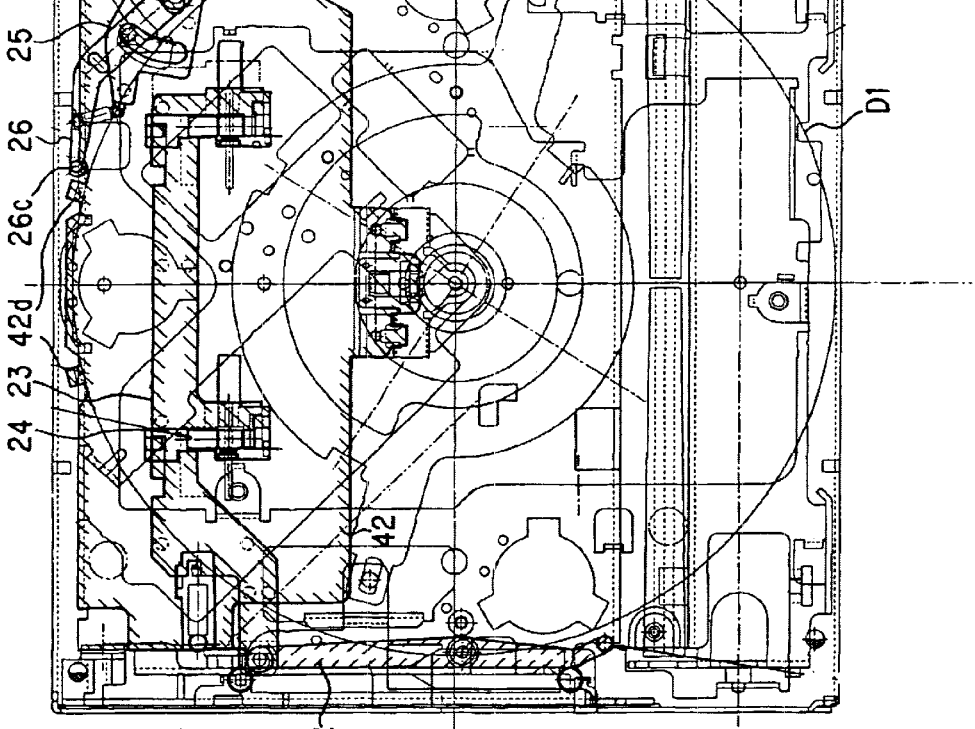
Figure 5B:
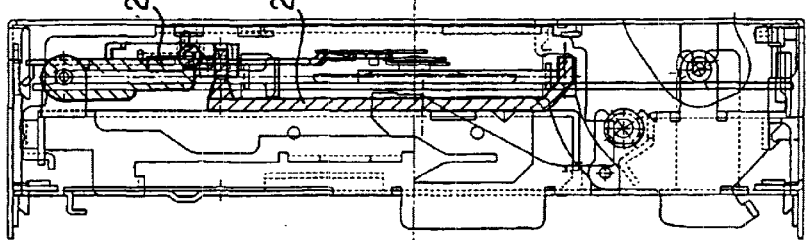

In FIGS. 4(a) to 4(c), as the adjusting plate 25 rotates about the shaft 28 in a clockwise direction, its rear end 25c pushes the rack plate 33 forward. Then, a rack 33a of the rack plate 33 meshes with a pinion 16 which is rotationally disposed in the lower chassis 3 and is rotationally driven by the feed motor. By the action of the pinion 16, the rackplate 33 is locked by the sus-lock plate 32 in a position slightly forward of its original position. In this way, as shown in FIGS. 5(a) to 5(c), the sus-lock plate 32 is conveyed by the pinion 16 to the forward predetermined position. This causes the Y-shaped lock groove 32b of the sus-lock plate 32 to be disengaged from the Y-shaped lock groove 4b of the suspension chassis 4, and thus the suspension chassis 4 is supported by the damper in the floating state. Simultaneously, the feed plate 13 is rotated by the front end of the sus-lock plate 32 about the shaft 13a in a clockwise direction, and the feed roller 12 moves away from the large-diameter disc D1 and is locked in the state. Moreover, the guide pin 34 of the sus-lock plate 32 is detached from the guide piece 46 formed in the right-hand plate 42c of the clamping arm 42. This causes the clamping arm 42 to rotate downwardly about the shaft 43, and its disc clamp 44 pushes the large-diameter disc D1. Consequently, the large-diameter disc D1 is held in the device such that its center hole is positioned in the center axis of the turntable. In this way, the center of the large-diameter disc D1 coincides with the center of the turntable, and thus the outer edge of the back portion of the large-diameter disc D1 is located at an offset-equivalent distance from the positioning projection 42d and the front-end pin 26c of the shift arm 26. This state is maintained by the extension coil spring 26a of the adjusting plate 26. Moreover, in response to the signal fed from the sensor after the detection of this state, the turntable is rotationally driven by the spindle motor, and the optical pickup is activated to read the signal recorded in the large-diameter disc D1, thereby achieving reproduction of the disc.

Now, an ejecting operation for ejecting the large-diameter disc D1 out of the device will be described below. On completion of reproduction of the large-diameter disc D1, the ejection button is pressed and the feed motor is rotated in the reverse direction. Consequently, in FIGS. 5(a) to 5(c), the pinion 16 acts to move the rack plate 33 and the sus-lock plate 32 inward. This, as shown in FIGS. 4(a) to 4(c), causes the feed plate 13 to be unlocked and return to its original position by the force exerted by the spring. Subsequently, the feed roller 12 makes contact with the large-diameter disc D1 so that the large-diameter disc D1 is ejected frontward out of the device. The remainder of the operation is the reverse of the above-described operation. On completion of the operation, as shown in FIGS. 6(a) to 6(c), the large-diameter disc D1 returns to the insertion/ejection position.

Secondly, a description will be given below as to the operation of the disc reproducing device, as observed when a small disc 8 centimeters in diameter is inserted thereinto. In FIGS. 7(a) to 7(c), in the normal state, the lock plate 23 is maintained in its position by the pull of the extension coil spring 23a. The lock piece 24c of the lock pin 24 is pressed down from its top side by the outer edge of the lock groove 23c of the lock plate 23 so that the lock pin 24 protrudes downwardly toward the lower portion of the clamping arm 42. Moreover, the adjusting plate 25 has its rear end 25c pressed by the rack plate 33 and has its front end 25b abutted against the lock plate 23, and is thereby maintained in its position. In this state, when the small-diameter disc D2 is inserted into the device, the photodetector detects the insertion and generates a signal. In response to this signal, the feed motor rotates and thereby the feed roller 12 conveys the small-diameter disc D2 toward the inside of the device.

After the small-diameter disc D2 is conveyed inside the device, as shown in FIGS. 8(a) to 8(c), the outer periphery of the small-diameter disc D2 pushes the front-end pin 26c of the shift arm 26. This causes the shift arm 26 to rotate about the shaft 28 in a clockwise direction. The guide pin 26b of the shift arm 26 is received in the catch portion 25f provided in the guide hole 25e of the adjusting plate 25. Thus, the rotation of the shift arm 26 causes the adjusting plate 25 to rotate. This rotation is stopped by abutting the outer periphery of the small-diameter disc D2 against the lock pin 24, thereby achieving positioning of the small-diameter disc D2. In this state, the center of the small-diameter disc D2 is located inwardly at an offset d relative to the center of the disc clamp 44. Then, the rear end 25c of the adjusting plate 25 pushes the rack plate 33 slightly forward. This causes the rack 33a of the rack plate 33 to mesh with the rotating pinion 16. Then, in a manner similar to that described above, the rack plate 33 is coupled to the sus-lock plate 32 so as to move forward, and the suspension chassis 4 and the lower chassis 3 disengage with each other. Subsequently, the clamping arm 42 moves down, and, as shown in FIGS. 9(a) to 9(c), the disc clamp 44 holds the small-diameter disc D2 in the turntable. In this state, the outer edge of the back portion of the small-diameter disc D2 is located at an offset-equivalent distance from the lock pin 24 and the front-end pin 26c of the shift arm 26. In response to the signal fed from the sensor, the turntable rotates and the optical pickup reads the signal recorded in the small-diameter disc D2, thereby achieving reproduction of the disc.

Figure 10A:
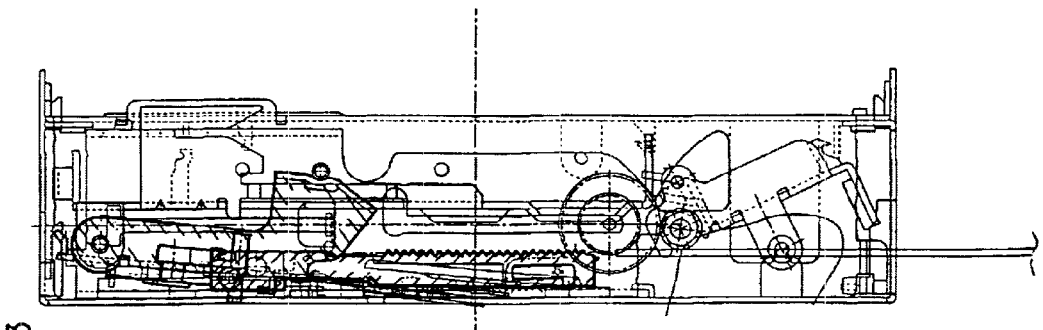
FIG. 10(a) is a schematic plan view illustrating the disc reproducing device of the embodiment of the present invention, wherein a small-diameter disc is being ejected therefrom.
Figure 10B:
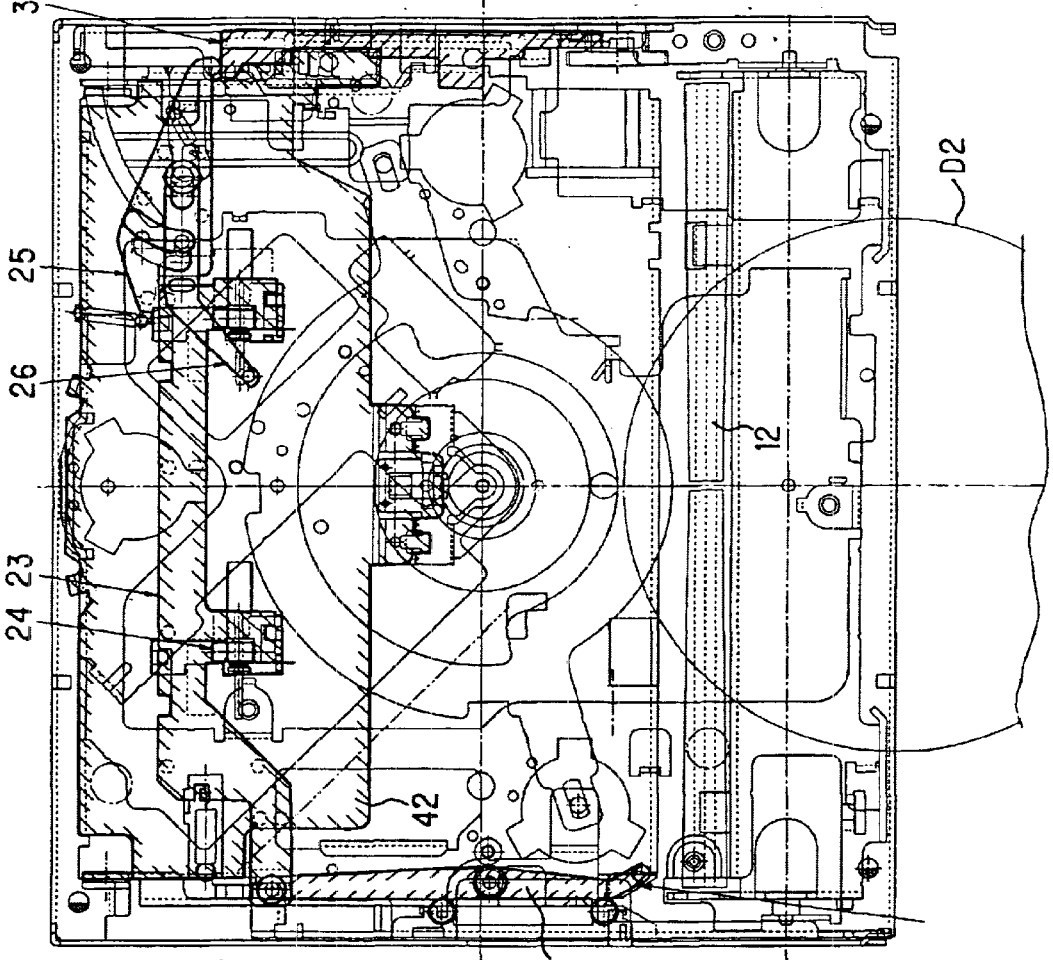
FIG. 10(b) is a schematic left-hand side view illustrating the disc reproducing device of the embodiment of the present invention, wherein a small-diameter disc is being ejected therefrom.
Figure 10C:
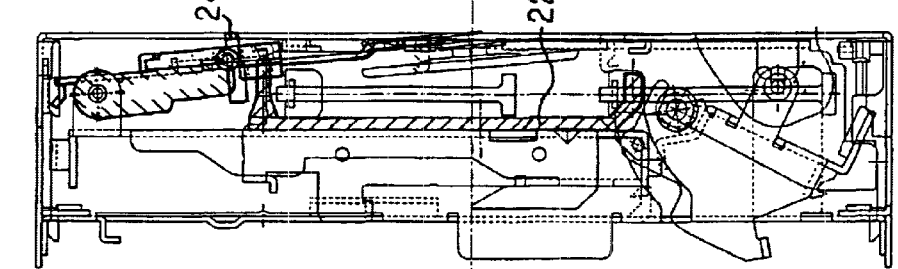
FIG. 10(c) is a schematic right-hand side view illustrating the disc reproducing device of the embodiment of the present invention, wherein a small-diameter disc is being ejected therefrom.

On completion of reproduction of the small-diameter disc D2, the ejection button is pressed and the feed motor is rotated in the reverse direction. Thus, in FIGS. 9(a) to 9(c), the pinion 16 acts to move the rack plate 33 and the sus-lock plate 32 inward. This, as shown in FIGS. 8(a) to 8(c), causes the feed plate 13 to be unlocked and return to its original position by the force exerted by the spring. Then, the feed roller 12 makes contact with the small-diameter disc D2 so that the small-diameter disc D2 is ejected frontward out of the device. The remainder of the operation is the reverse of the above-described operation. On completion of the operation, as shown in FIGS. 10(a) to 10(c), the small-diameter disc D2 returns to the insertion/ejection position.

As described heretofore, the disc reproducing device of the embodiment is provided with a disc detecting mechanism 21, the disc detecting mechanism 21 including: a disc detecting lever 22 which is rotated about the shaft 27 by making contact with the outer periphery of the large-diameter disc D1 inserted into the device by the feed roller 12; a lock plate 23 which moves horizontally in synchronization with the movement of the front end of the disc detecting lever 22; a lock pin 24 which is, in the normal state, locked by the lock plate 23 in a protruding state so as to position the small-diameter disc D2 inserted into the device in the reproducing position, is unlocked by the movement of the lock plate 23 in the horizontal, inward direction A, is pushed by the outer periphery of the inserted large-diameter disc D1 to its down position, and is locked in the falling-down state by the movement of the lock plate 23 in the horizontal, outward direction B caused by the passage of the largest dimensioned portion of the large-diameter disc D1 over the pin 22a provided in the main end of the disc detecting lever 22; an adjusting plate 25 which follows the horizontal movement of the lock plate 23 so as to move in the same direction, and is rotatable about the shaft 28; and a shift arm 26 which is so arranged as to be rotatable about the shaft 28, is unlocked by the horizontal movement of the adjusting plate 25, and is rotated by being pressed by the outer periphery of the large- or small-diameter disc D1 or D2. In this construction, when the small-diameter disc D2 is inserted into the device, the lock pin 24 serves to position the small-diameter disc D2 in the reproducing position. On the other hand, when the large-diameter disc D1 is inserted into the device, the lock pin 24 is pushed by the outer periphery of the large-diameter disc D1 to its down position. Accordingly, it is possible to provide an inexpensive and structurally simple disc reproducing device capable of reproducing a disc, regardless of whether it is a large-diameter disc D1 or a small-diameter disc D2, simply by inserting the disc into the device.

Although the present invention has been particularly shown and described with reference to a preferred embodiment illustrated in the accompanying drawings, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A disc reproducing device for reproducing a large-diameter disc or a small-diameter disc, said device having a disc detecting mechanism that comprises:

a disc detecting lever having a main end rotated by being pressed by an outer periphery of a large-diameter disc inserted into the device, and having a horizontally movable front end, said disc detecting lever rotating in a reverse direction after passage of a largest dimensioned portion of the large-diameter disc;

a lock plate coupled to said front end to move horizontally from a rest position in response to movement of said front end when said main end is rotated by being pressed by the outer periphery of the large-diameter disc;

a lock pin that is movable between a protruding position and a down position and that is locked in the protruding position by said lock plate when said lock plate is in the rest position; and means for positioning the inserted large-diameter disc in said device, wherein:

said lock pin is locked by said lock plate in the protruding state when a large-diameter disc is not inserted in said device;

when a small-diameter disc is inserted into said device, said locking pin remains locked in the protruding position by said lock plate and said locking pin acts as a positioning element for the inserted small-diameter disc;

when a large-diameter disc is inserted into said device, said locking pin unlocked in response to the horizontal movement of said lock plate from the rest position, and is pushed by the outer periphery of the inserted large-diameter disc to the down position, and after the largest dimensioned portion of the large-diameter disc has contacted said means for positioning, said lock plate moves toward the rest position, in response to movement of said disc detecting lever in the reverse direction, to lock said lock pin in the down position.

2. The disc reproducing device according to claim 1, wherein said disc detecting mechanism further comprises: an adjusting plate that follows the horizontal movement of said lock plate so as to move horizontally, and moves rotatably about a shaft; and a shift arm arranged rotatably about said shaft, the shift arm being unlocked by a horizontal, inward movement of said adjusting plate and rotated by being pressed by the outer periphery of a large- or small-diameter disc.

3. The disc reproducing device according to claim 2, further comprising: a disc clamping mechanism having clamping means for retaining a large-diameter disc or a small-diameter disc inserted into said device in a turntable, said clamping means being rotated in synchronism with a rotation of said adjusting plate.

4. The disc reproducing device according to claim 3, wherein an inserted position of a large-diameter disc determined by said positioning means and an inserted position of a small-diameter disc determined by said lock pin are offset inwardly in the device relative to a position of the large-diameter disc or the small-diameter disc retained in the turntable by said clamping means.

5. The disc reproducing device according to claim 4, further comprising: a suspension chassis for rotationally supporting a clamping arm of said disc clamping mechanism, the suspension chassis being supported via a damper and a damper spring by a main chassis of the device.

6. The disc reproducing device according to claim 5, wherein said suspension chassis has suspension lock means for fixing, n a normal state, said suspension chassis to said main chassis and for releasing the fixing during reproduction of a disc.

7. The disc reproducing device according to claim 6, wherein a movement of said adjusting plate drives said suspension lock means to operate, and a movement of said suspension lock means rotates said clamping arm so as to clamp a large-diameter disc or a small-diameter disc.

8. A disc reproducing device comprising:

chassis mechanism composed of an upper chassis, a lower chassis, and a suspension chassis; a disc conveyance mechanism for conveying a small-diameter disc or a large-diameter disc between an insertion/ejection position and a reproducing position within the device;

disc detecting mechanism having a positioning means for positioning a small-diameter disc inserted into said device, and a lock means movable into a locking position for locking said positioning means and movable into an unlocking position for unlocking said positioning means to allow said positioning means to be displaced by the outer periphery of a large-diameter disc when the large-diameter disc is inserted into said device;

a suspension lock mechanism for locking and unlocking said suspension chassis relative to said lower chassis in synchronism with movements of said disc detecting mechanism;

a disc clamping mechanism disposed in said suspension chassis for clamping the disc conveyed to said reproducing position onto a turntable; and a disc reproducing mechanism for reproducing the clamped disc.

* * * * *

UNITED STATES PATENT AND TRADEMARK OFFICE
CERTIFICATE OF CORRECTION

PATENT NO. : 6,661,764 B2
DATED : December 9, 2003
INVENTOR(S) : Hino et al.

It is certified that error appears in the above-identified patent and that said Letters Patent is hereby corrected as shown below:

Column 12,
Line 34, delete "n" and insert therefor -- in --;
Line 43, before "chassis" insert -- a --.

Signed and Sealed this

Twentieth Day of July, 2004

JON W. DUDAS
*Acting Director of the United States Patent and Trademark Office*